United States Patent [19]
Keehn et al.

[11] Patent Number: 5,803,424
[45] Date of Patent: Sep. 8, 1998

[54] ADJUSTABLE HANGER FOR MOUNTING AN ANTI-GLARE FILTER ON A MONITOR

[75] Inventors: Donald L. Keehn, Healdsburg; David L. Soberanis, Camarillo, both of Calif.

[73] Assignee: Optical Coating Laboratory, Inc., Santa Rosa, Calif.

[21] Appl. No.: 969,382

[22] Filed: Nov. 13, 1997

Related U.S. Application Data

[63] Continuation of Ser. No. 561,609, Nov. 21, 1995, abandoned, which is a continuation-in-part of Ser. No. 227,298, Apr. 13, 1994, abandoned, which is a continuation of Ser. No. 724,427, Jul. 3, 1991, abandoned.

[51] Int. Cl.⁶ .................................................... A47G 1/16
[52] U.S. Cl. ........................... 248/489; 248/918; 359/609
[58] Field of Search ................... 248/489, 442.2, 248/451, 205.1, 918; 359/609

[56] References Cited

U.S. PATENT DOCUMENTS

| | | | |
|---|---|---|---|
| 3,601,915 | 8/1971 | Millan | 248/130 |
| 4,577,928 | 3/1986 | Brown | 359/609 |
| 4,712,870 | 12/1987 | Robinson et al. | 359/738 |
| 4,834,330 | 5/1989 | Swillinger | 248/205.2 |
| 4,848,874 | 7/1989 | Mui et al. | 359/609 |
| 4,880,300 | 11/1989 | Payner et al. | 248/918 X |
| 4,902,078 | 2/1990 | Judd | 248/918 X |
| 4,946,121 | 8/1990 | Troke | 248/205.3 X |
| 4,948,083 | 8/1990 | McNaney, Jr. et al. | 248/514 |
| 5,076,665 | 12/1991 | Petersen | 359/601 X |
| 5,078,358 | 1/1992 | Egly et al. | 248/918 X |
| 5,082,235 | 1/1992 | Crowther et al. | 248/442.2 X |
| 5,155,627 | 10/1992 | Keehn et al. | 359/609 |

OTHER PUBLICATIONS

MISCO Catalog (p. 30; estimated date), Apr. 1930.
MISCO Preview of New Products Catalog (pp. 2c–8c) Spring edition, 1990.
UARCO Catalog (p. 430) Fall edition, 1989.
OCLY News Release, Mar. 1990.

*Primary Examiner*—Ramon O. Ramirez
*Attorney, Agent, or Firm*—Workman, Nydegger & Seeley

[57] ABSTRACT

An adjustable hanger for mounting an article such as an anti-glare filter or electromagnetic shield or other cover on a second article such as a computer monitor. The hanger has an L configuration defined by two legs, a first one of which extends along the side/front of the monitor and the second of which rests on, i.e., is supported on, the top surface of the monitor. In a top mounting embodiment, the first leg of the hanger attaches to the top of the filter. A side mounting version preferably uses two hangers, which attach to opposite sides of the filter. The second or top leg preferably has a high-friction bottom surface or pad for providing non-slip positioning on the monitor. The depending leg includes a clamp or enclosure which mounts on the cover's bezel, providing ease of mounting on and removal from the cover. The relative size and configuration of the clamp and bezel can be selected to provide a secure fit. In one embodiment, the clamp provides an interference fit with the bezel. Alternatively, in combination with the interference fit configuration, a compressible friction pad mounted on the interior surface of the clamp provides slip-free mounting of the clamp along the cover. In other embodiments, mating tabs and holes or mating teeth secure the bezel to the hanger clamp, preferably in combination with an interference fit.

14 Claims, 4 Drawing Sheets

ADJUSTABLE HANGER FOR MOUNTING AN ANTI-GLARE FILTER ON A MONITOR

This is a continuation of U.S. patent application Ser. No. 08/561,609, entitled ADJUSTABLE HANGER FOR MOUNTING AN ANTI-GLARE FILTER ON A MONITOR, filed Nov. 21, 1995, in the name of inventors Donald Keehn and David L. Soberanis, now abandoned; which is a continuation-in-part of U.S. patent application Ser. No. 08/227,298, filed Apr. 13, 1994 in the name of inventor David L. Soberanis, entitled ADJUSTABLE SNAP HANGER FOR MOUNTING AN ANTI-GLARE FILTER ON A MONITOR, now abandoned; which is a continuation of U.S. patent application Ser. No. 07/724,427, filed Jul. 3, 1991, in the name of inventor David L. Soberanis, entitled ADJUSTABLE SNAP HANGER FOR MOUNTING AN ANTI-GLARE FILTER ON A MONITOR, now abandoned.

I. BACKGROUND OF THE INVENTION

Display screens such as computer monitors come in different sizes, as do the anti-glare filters or panels for display screens. It is desirable to be able to readily and detachably mount anti-glare filters of various sizes on monitors of various sizes. In addition, it is desirable for such hangers to be compact and of simple design.

II. SUMMARY OF THE INVENTION

In one aspect, the present invention is embodied in a hanger which comprises (a) an elongated first leg member and (b) an elongated second leg member, which is adapted for resting on a top surface of an article such as a monitor. The second leg member is joined to the first leg member forming a generally L-shaped configuration such that when the second leg member rests on top of the monitor, the first leg member depends downward along the front of the monitor. The hanger also includes (c) a clamp which is joined to the first leg member and is adapted for holding a member such as the bezel of an anti-glare filter and orienting the plane of the filter generally vertically in front of the viewing screen or face of the monitor. Preferably, the hanger comprises one or more friction means which are formed on or adapted for adhering to the underside of the second leg for retaining the second leg on the top surface of the monitor with the first leg extending along the front surface of the monitor.

The present invention includes several embodiments of the clamp. In a first, snap-fit interference embodiment, the size and configuration of the clamp are selected to provide a snap-on, friction fit for effecting the releasable mounting of the hanger along a member such as a bezel. Second, in a detent mounting embodiment, an array of holes is formed in either of the clamp and the enclosure and the corresponding side of the bezel, and at least one mating tab is formed in the other of the clamp and the side of the bezel. Third, in an alternative detent mounting embodiment, the detent mounting is effected by an array of mating or interlocking teeth or tabs formed in the first leg and the bezel. A fourth embodiment combines the snap fit clamp and the detent arrangement.

In a preferred snap clamp embodiment, the clamp preferably comprises an enclosure defined by a first side member; a second side member joined to and extending transverse to the first side member in a generally L configuration; a third side member joined to and extending transverse to the first side member spaced from the second side member; and a fourth side member joined to and extending transverse to the second side member spaced from the first side member. The four side members are of suitable size and spacing for receiving and compressively retaining a top section of an antiglare filter bezel of given cross-section size. The third and fourth side members define an opening in the enclosure generally in the front thereof for pivotally inserting the bezel into the enclosure and pivotally removing the bezel from the enclosure. Also, the first and second side members support and orient the member such as a bezel and the third and fourth side members retain the bezel against the first and second side members.

In yet another preferred aspect, the third and fourth side members are shorter than the second and first side members, respectively, and can comprise lips.

In a top mounting embodiment, the hanger is adapted for mounting a member such as a bezel of an antiglare filter via a top section thereof, in that the first leg member and the second leg member are elongated horizontally, side to side along the monitor and the first or second side member of the snap clamp is joined to the first leg member.

In a preferred top mounting snap clamp arrangement, the first side member of the clamp extends backward from the second leg member of the hanger and the opening is oriented toward the bottom front of the clamp. The hanger's second leg member is of convex cross-section top-to-bottom as viewed from the front of the hanger (concave rearward facing curvature), and is closely spaced to the clamp enclosure and the opening therein, for covering the snap clamp, providing a pleasing streamlined appearance, and preventing accidental dislodging of the bezel from the clamp.

In a side mounting embodiment, the first leg of the hanger and the associated clamp are oriented for engaging one of the opposite (left or right) sides of the bezel. Preferably, another hanger is provided in which that hanger's first leg and the associated clamp are oriented for engaging the other (right or left) side of the bezel, so that the bezel and the associated filter extend side to side (horizontally) between the hanger clamps, along the front of the monitor's CRT screen or other viewing screen.

III. BRIEF DESCRIPTION OF THE DRAWING

The above and other aspects of the invention are described with respect to the accompanying drawings (not to scale), in which.

IV. DETAILED DESCRIPTION

A. Overview of Hanger(s) and Bezel

Figure 1:
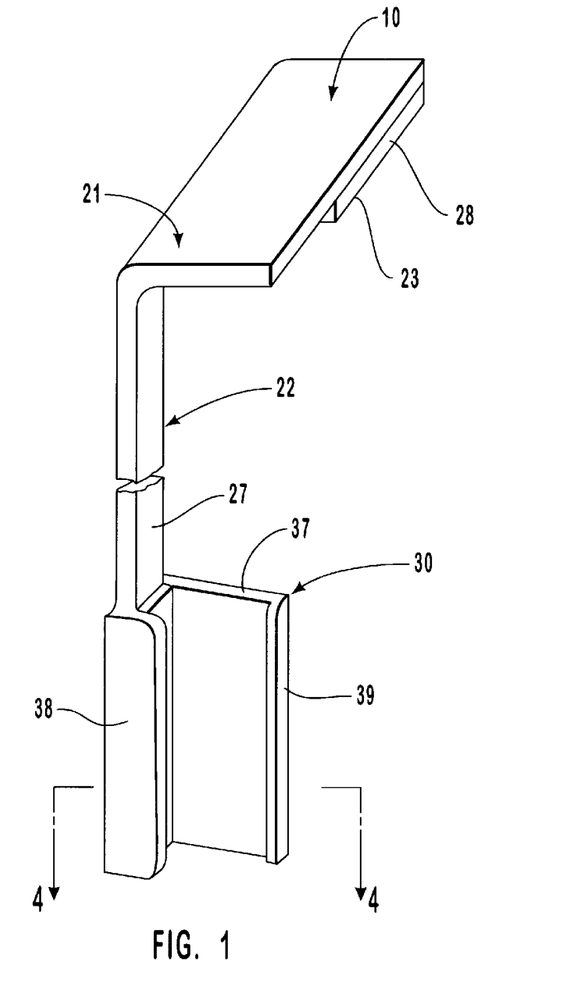
FIG. 1 is a perspective view of a side mounting snap-fit hanger.
Figures 2, 3:
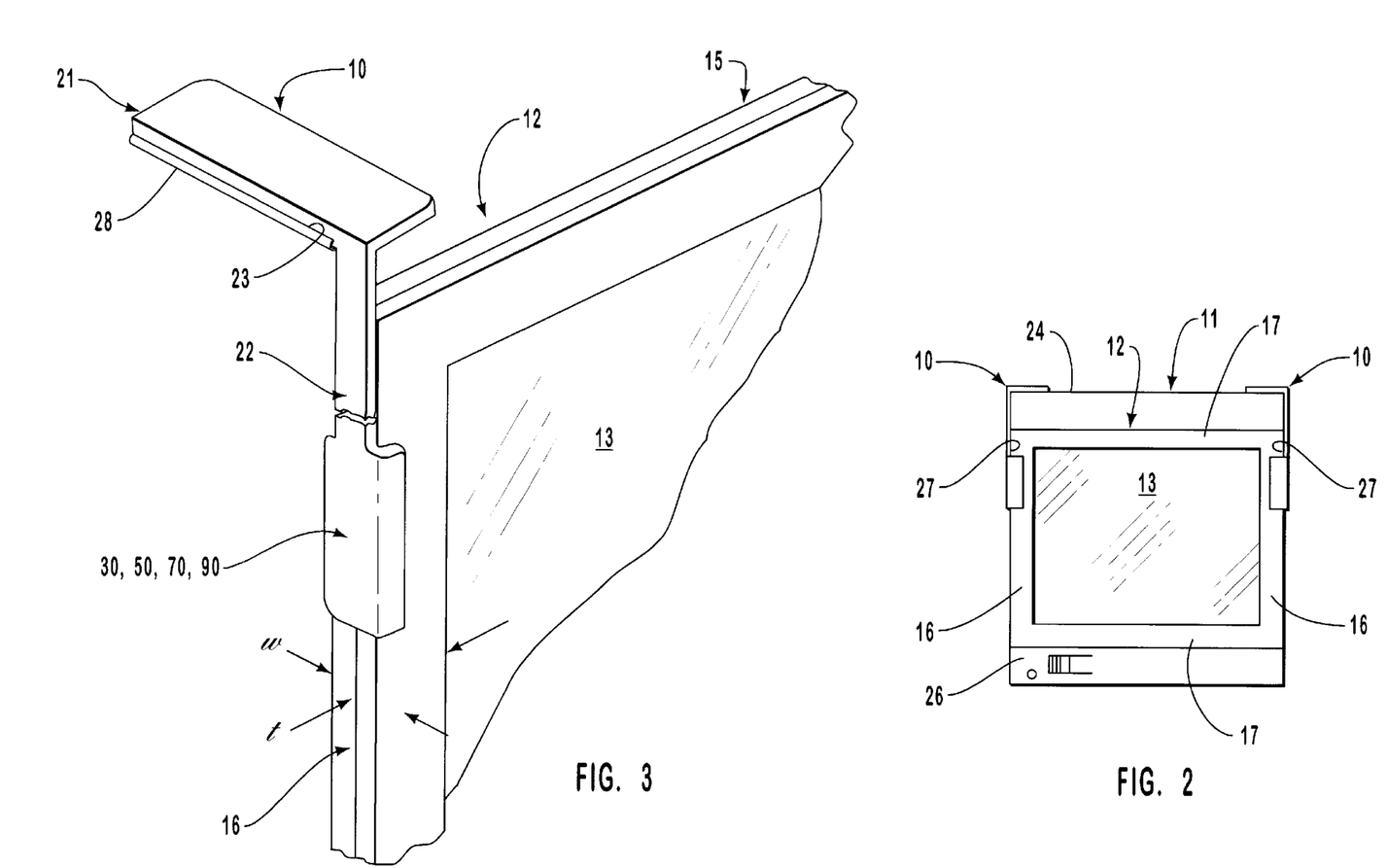
FIG. 2 is a simplified front elevation view of a monitor illustrating the use of two of the FIG. 1 hangers to support a cover or anti-glare filter in front of the display screen of the monitor.
FIG. 3 is an enlarged, partial perspective view showing the hanger of FIG. 1 mounted on the filter of FIG. 2.

FIGS. 1–3 illustrate one embodiment of the present invention in the form of a side mount hanger or holder 10. FIGS. 11–14 illustrate another embodiment of a hanger in accordance with the present invention, specifically a top mount hanger 100. Preferably, two side mount hangers 10 are used to adjustably and removably position a first article 12 on a second article 11. Typically, only one hanger 100 is required to stably mount the first article 12 on the second article 11, although two hangers 100 can be used which are spaced apart along the top of the article 12, for example, at or toward the opposite ends of the article 12. The first article 12 may be, for example, a cover such as the illustrated anti-glare filter. The second article 11 may be, for example, an LCD (liquid crystal display) or a CRT (cathode ray tube) monitor. As illustrated in the figures, the side mount hanger 10, FIGS. 1–3, and the top mount hanger 100, FIGS. 11–14, position the anti-glare filter so the aperture of its viewing screen (also called panel or plate herein) covers the aperture of the face or screen of the CRT or other display at the front or viewing side of the monitor. Typically, the cover 12 includes viewing screen 13 and a polygonal bezel 15 surrounding the viewing screen. The bezel 15 includes frame members 16—16 on opposite left and right sides of the viewing screen and frame members 17—17 on opposite top and bottom sides of the viewing screen. The illustrated frame members 16 and 17 form a rectangular bezel.

As shown for example in FIG. 3, the cross-section of the illustrated bezel frame members 16 and 17 is rectangular. For convenient reference, the width, w, of the bezel frame members 16 and 17 is measured in a direction transverse to the plane of the viewing screen 13 and their thickness, t, is measured parallel to the plane of the viewing screen. The rectangular bezel cross-section is given by way of example only, for the present invention is useful for mounting bezels of substantially any cross-sectional configuration, such as polygonal in general and arcuate. As discussed more fully below, the important consideration is to use a bezel 15 and a clamp or clip (such as clamp 30, 50, 70, 150, 160 or 180) which mate with and provide a close fit to one another.

B. Terminology and Definitions

Please note, words such as "edge" and phrases such as "proximate the edge" are used herein to define the position of the clamp leg members relative to the bezel, not to limit one leg or support member to a position on an edge of another member. For example, the second leg member could extend downward beyond the point of joinder of the fourth member or lip. In such a case, the lip is positioned merely "proximate the bottom edge" of the second leg member, rather than at the edge thereof. Thus, it should be apparent that a broad interpretation is intended for "proximate," in the sense that the word covers a range of distances from closely adjacent to, on the one hand, to spaced a considerable distance from, on the other. Also, words such as "vertical" and "horizontal;" "front," "rear," "top," "bottom," "left" and "right;" and "upward," "downward, "rearward" and "forward" are used herein without limitation, to illustrate the relative orientation of various members and components.

As used here, "detent" includes structures having mating, interlocking teeth, including rack and pinion and ratchet structures, as well as mating hole and tab structures, etc.

Reference is made herein to a bezel mounted on or mounting an optical filter or other panel or cover. However, it is understood the "bezel" may simply be an appropriately shaped integral or separate mounting region or edge. For example, the cover/panel may be a sheet, which has an appropriate coating, and a periphery or edge that is suitably shaped as described herein so that it can be used as a bezel. For example, the cover/panel can be molded from polymer, that is, plastic, with an integral enlarged bezel edge. Although the illustrated bezels have a rectangular cross-section and a mating complementary clamp of rectangular interior cross-section, other mating/complementary configurations will also work, including, but not limited to, polygons generally, and circular, ovular and other arcuate configurations.

As used here, "friction means," "friction pad" and "friction pad means" include separate strips of tape or pads, etc. having a friction or "sticky" surface, as well as integral friction surfaces formed, for example, by chemically or mechanically roughening the surface of the hanger leg.

C. Side Mount Hanger 10

The hanger 10 comprises a pair of interconnected leg members 21 and 22 oriented in a generally transverse or L configuration, such that a first one 22 of the legs depends along the front side 26 of the monitor, with side or surface 27, FIG. 1, facing medially across the front of the monitor, when the second or top leg 21 is positioned with the bottom side or surface 23 thereof resting on the top surface 24 of the monitor.

The bottom side 23 of the top leg 21 incorporates friction means 28 (also called "friction pad" and "friction pad means") formed on (adhered to or fabricated as an integral part of) the bottom surface. One embodiment is a strip or pad 28 which (1) is adhered to the bottom surface of the leg and is a sticky, high friction material such as a cellular foam material, or (2) has a high friction bottom surface 29 formed thereon of such material, for providing secure positioning on the top surface 24 of the monitor. The friction pad 28 can be a resilient cellular foam pad such as a high density closed cell vinyl foam pad, with a high tack, pressure sensitive acrylic adhesive on the upper side, such as the 3M SCOTCHFOAM product, product number 4516.

D. Snap Pit Interference Clamp 50

Figure 5:
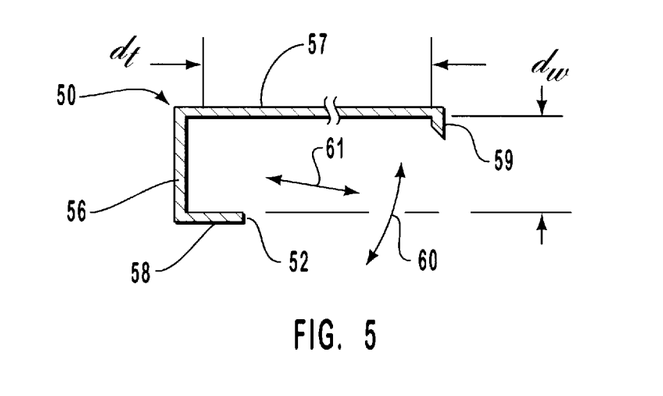
FIG. 5 is a cross-section view of another embodiment of a snap-fit clamp.

A cross-sectional view of interference embodiment 50 of the snap-fit clamp is depicted in FIG. 5. The clamp 50 is formed integrally with the first leg 22 and extends medially from the inside thereof (that is, extends toward the medial or middle of the monitor screen). The clamp 50 is formed integrally with the first leg 22 and defines an enclosure 58-56-57-59 having a cross-sectional configuration complementary to the configuration of the bezel 15 and having an opening 52 therein for permitting releasable snap-fit mounting on the bezel.

Referring further to FIG. 5, in the illustrated rectangular configuration, the snap-fit clamp 50 includes a first side member 56 which extends along the outside edge of the mating bezel side member 16. A second side member 57 extends transversely (medially) from the first side member 56 and along the back surface of the bezel side member 16. A third side member 58 extends transversely from the first side member 56 and is spaced from the second side member 57 a distance $d_w$ somewhat less than the corresponding dimension, w, of the corresponding bezel side frame member 16. A fourth side frame member 59 extends transversely from the second side member 57 and is spaced from the first side member 56. The third and fourth side members 58 and 59 are relatively short, shorter than the first and second side members.

The relatively short fourth leg member 59 can comprise a lip extending from the second leg member 57. Also, the relatively short third leg member 58 can comprise a lip extending from the first leg member 56. These relatively short side members define an opening 52 therebetween which permits releasable snap-fit mounting of the clamp on the bezel and removal from the bezel without adversely affecting the ability of the clamp to securely retain the bezel in position in the clamp. Specifically, the bezel 15 is mounted to the clamp 50 by inserting the bezel along path 61 through the opening 52 at an acute angle to leg 57, then pivoting the bezel counterclockwise along path 60 into the clamp. To remove the bezel, the process is reversed, that is, the bezel is pivoted clockwise out of engagement with the clamp and is withdrawn from the clamp.

As alluded to above, the dimension $d_w$ between opposite legs 57 and 58 is smaller than the corresponding outside dimension, w, of the corresponding bezel frame, so there is an interference between the clamp and the bezel. The dimension $d_l$, which corresponds approximately to the length of side 57, provides sufficient mechanical advantage and lever arm when the clamp is pivoted along path 60 onto the bezel frame (or, conversely, when the bezel frame is pivoted into place within the clamp) to overcome the interference fit and snap the shortened leg 59 of the clamp over the bezel frame and force the frame into the clamp, thereby pinching the frame and, by operation of the interference fit, precluding the frame from sliding along the clamp.

As an example of dimensions, the frame dimension w ranges from 0.380 inches to 0.385 inches, the corresponding inside snap-clamp width $d_w$ is about 0.379 inches, providing an interference of 0.001 inches to 0.006 inches between the bezel and the clamp, and the length $d_l$ of the clamp is about ⅝ inches.

Preferably, the various hangers and clamps described herein are integral and are injection molded of a flexible, light weight, plastic material such as polycarbonate, high impact styrene or acrylonitrile-butadiene-styrene. This material is durable and has sufficient rigidity to clamp the cover and to retain the cover in the desired orientation without distorting, yet is sufficiently flexible to permit ready clamping by simply inserting the bezel through the clamp opening and into the clamp with a slight pivotal or twisting motion, and ready removal by twisting the bezel in the reverse direction.

E. Resilient Pad-Assisted, Snap Fit Interference Clamp 30

Referring initially to FIGS. 1 and 3, snap-fit clamp 30 is formed integrally with the hanger's first leg 22 and extends medially from the inside thereof (that is, extends toward the medial or middle of the monitor screen). Referring also to the cross-sectional views depicted in FIG. 4, the snap-fit clamp 30 defines an enclosure 38-36-37-39 having a cross-sectional configuration complementary to the configuration of the bezel and having an opening 32 therein for providing releasable snap-fit mounting on the bezel 15. The side members 36–39 and the materials of the clamp 30 are configured and function as described above regarding the respective components 56–59 and the materials of clamp 50. In addition, in clamp 30, a resilient compressible friction pad 33 is adhered to the interior of the clamp side wall 36 by joining means such as adhesive. The resulting distance, $d_t$, FIG. 4, between the uncompressed pad and the opposite side 39 of the enclosure is slightly less than the corresponding distance, t, FIG. 3, of the bezel, for helping to securely mount the clamp on the bezel and frictionally oppose any tendency of one to slip or otherwise move relative to the other. Preferably, the resilient, high friction strip 33 is of the same construction as pad 28. That is, strip 33 comprises a resilient high density closed cell vinyl foam pad with a high tack, pressure sensitive acrylic adhesive on the lateral or outer side (as viewed in FIGS. 1 and 4), such as the 3M SCOTCHFOAM, product number 4516. Please note, the distance $d_t$ is of sufficient length to retain the mechanical advantage needed for snap-fit mounting.

Figure 4:
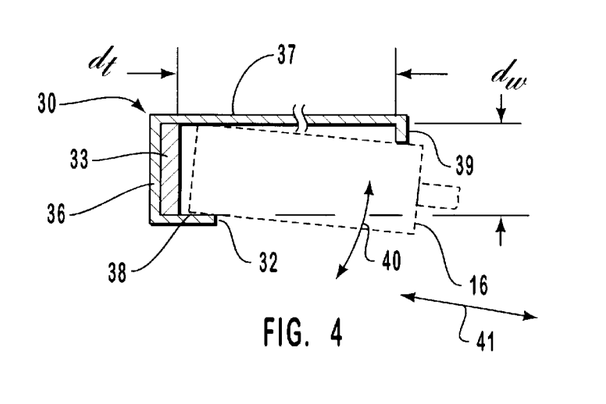
FIG. 4 is a section view taken along line 4—4 in FIG. 1 through the snap-fit clamp.

As alluded to above, the third and fourth side members 38 and 39, FIG. 4, are relatively short, and can comprise lips extending from the respective supporting leg members 36 and 37. Also, the relatively short side members 38 and 39 define an opening 32 therebetween which permits releasable snap-fit mounting of the clamp on the bezel and removal from the bezel without adversely affecting the ability of the clamp to securely retain the bezel in position in the clamp. Specifically, the bezel 15 is mounted to the clamp 30 by inserting the bezel along path 41 through the opening 32 at an acute angle to side 37, then pivoting the bezel counterclockwise along path 40. To remove the bezel, the process is reversed, that is, the bezel is pivoted clockwise out of interference engagement with the clamp and is withdrawn from the clamp.

The resilient pad-assisted snap-fit interference clamp 30 may be used advantageously for very large, heavy bezels. However, both the resilient pad-assisted interference fit embodiment 30 and the interference fit embodiment 50 securely position conventional filter screens on commercially available computer monitors.

F. Detent Clamp 70

Figure 6:
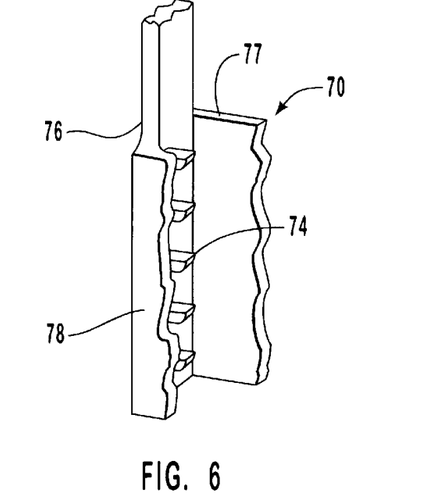
FIGS. 6 and 7 are partial perspective views, of a bezel (FIG. 7) and a mating anger clamp (FIG. 6) which comprise an interlocking tab-fit detent clamping arrangement which is an alternative embodiment of or an addition to the clamps of FIGS. 4 and 5.
Figure 7:
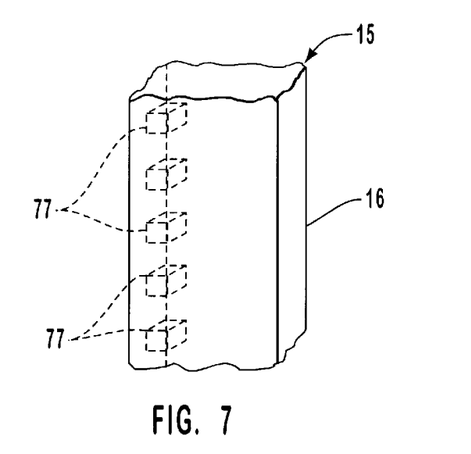
Figure 8:
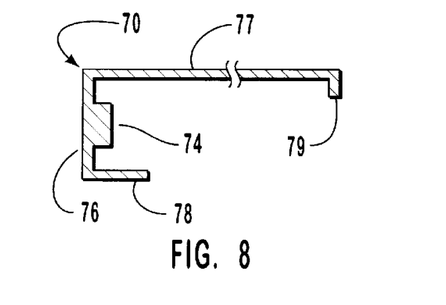
FIG. 8 is a horizontal cross-section view of the clamp of FIG. 6.

FIGS. 6–8 depict a clamp embodiment 70 which incorporates a "detent" arrangement. As shown, beveled or rounded-bottom tabs 74 are formed along the inside of the clamp side 76. The corresponding side of the bezel frame has mating holes 77 so that the clamp and holder fit together during the pivotal snap-in movement discussed above. Here, the snap-fit action can be used to position the clamp and associated hanger on the bezel, while the primary retaining or mounting function can be provided by the holes and tabs. That is, the clamp retains the mating holes and tabs in engagement, one with the other, so they securely retain the hanger in position along the bezel. However the tabs and holes are readily disengaged for removing or repositioning the hanger simply by prying apart the clamp side members or pivoting the hanger leg out of engagement with the bezel.

Figure 9:
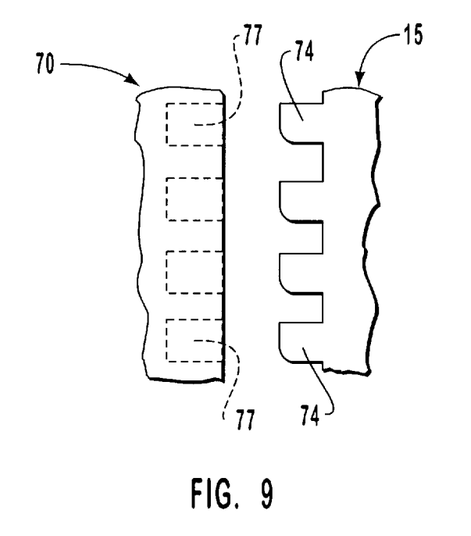
FIG. 9 depicts a section of a hanger and an associated bezel having an interlocking tab and hole detent mounting arrangement similar to that of FIGS. 6–8.

FIG. 9 depicts another version of the clamping arrangement 70 in which the mating tabs 74 and holes 77 are formed on the bezel and the clamp, respectively.

G. Mating Teeth Detent Clamp 90

Figure 10:
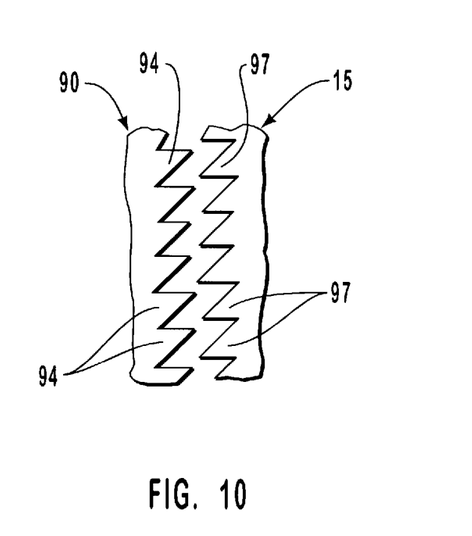
FIG. 10 depicts a section of a hanger and an associated bezel which incorporate an interlocking teeth detent mounting arrangement.

FIG. 10 is a partial view of an alternative detent clamp 90, in the form of a mating-teeth arrangement. Mating teeth 94 and 97 on the hanger and the bezel movably but securely retain the hanger in position along the bezel, with the side members of the clamping means again functioning, as in FIGS. 6–8, to retain the arrays of teeth on the hanger and the bezel in engagement with one another. The sides or walls 76–79 of the clamp or cover provide a close fit enclosure over the bezel which keeps the mating teeth engaged. In this detent type of arrangement, the teeth or tabs preferably are angled, for example, in the manner of the teeth in ratchet wrenches, so that the mating teeth slide over one another in one direction, but not in the other, allowing the claim and hanger to be moved (slide) upward along the bezel, to facilitate removal and repositioning, while preventing downward movement along the bezel.

E. Top Mount Hanger 100

Figures 11, 12, 13, 14:
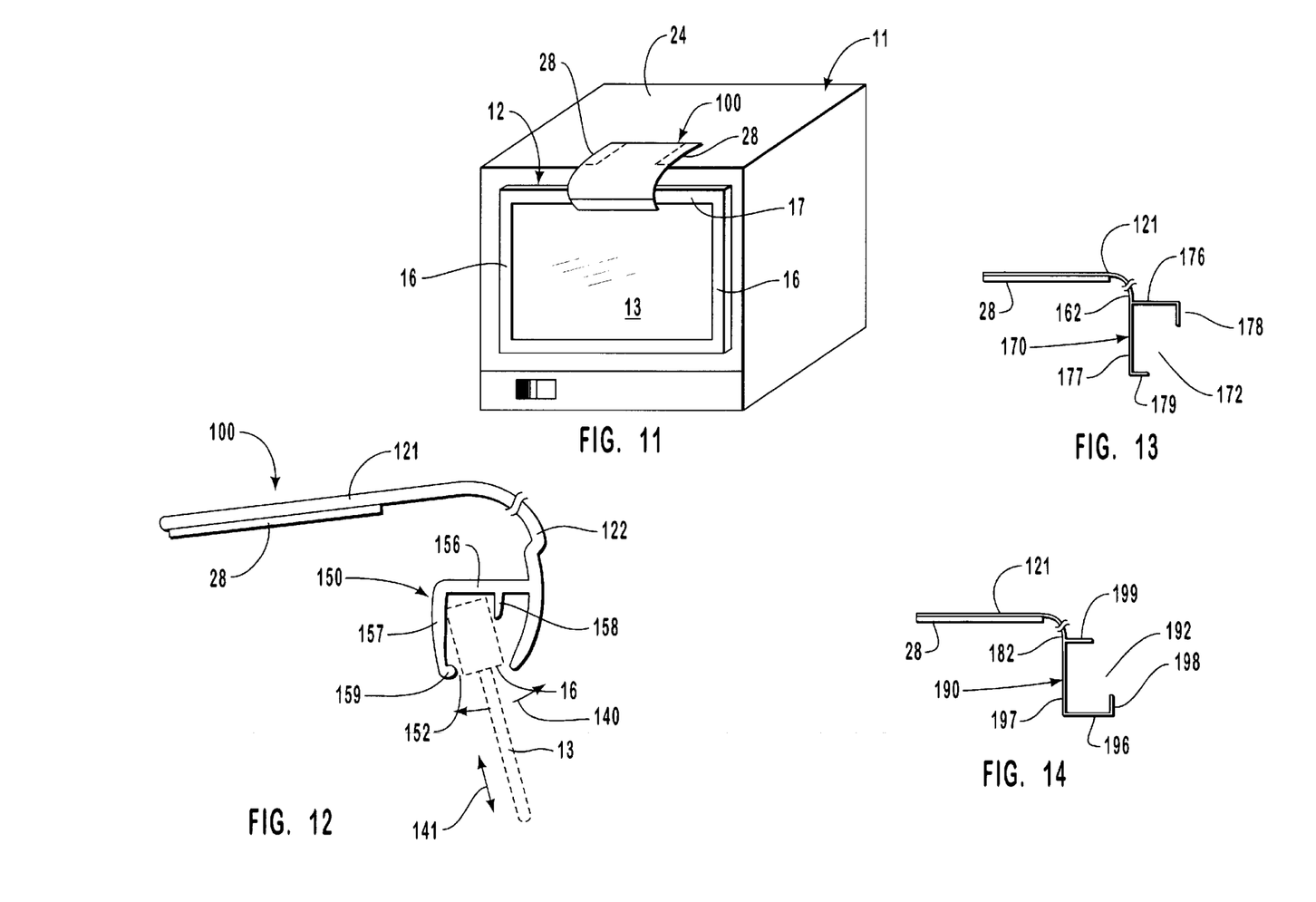
FIG. 11 is a perspective view of another embodiment of the present invention, a top mounting snap clamp hanger.
FIG. 12 is a simplified partial cross section view showing the top mounting snap clamp hanger of FIG. 11 mounting a cover such as an anti-glare filter.
FIGS. 13 and 14 depict alternative top mount snap clamps.

FIGS. 11 and 12 depict a presently preferred embodiment of a top mount hanger 100 in accordance with the present invention. Referring specifically to FIG. 11 and as alluded to previously, preferably, the hanger 100 clasps the anti-glare filter bezel 15 or other article 12 via the top frame member 17 thereof. As shown in the FIG. 12 cross-section, hanger 100 comprises a horizontally elongated first leg member 122 and a horizontally elongated second, top leg member 121 adapted for sitting on top surface 24 of an article 11 such as a monitor. The second leg member 121 is joined to the first leg member 122 forming a generally L-shaped configuration such that, when the second leg member rests on the monitor 11, the first leg member depends downward from the second leg member along the front of the monitor.

The hanger 100 also comprises a snap clamp 150 which is joined to the first leg member and comprises the following cross-section profile in a vertical plane perpendicular to the horizontal direction of elongation. A first side member 156 is joined to and extends rearward from the first leg member 122. A second side member 157 is joined to and extends downward from the first side member 156 rearward of the hanger's first leg member 122. A third side member 158, which is shorter than the second side member 157, is joined to and extends downward from the first side member 156 between the second side member 157 and the first leg member 122. The first, second and third side members thus form an inverted generally U-shaped enclosure. A fourth side member 159, which is shorter than the first side member 156, is joined to and extends forward from the second side member 157 below the first side member 156. The four side members 156–159 are of suitable size and spacing for receiving and compressively retaining the horizontal top section 17 of the anti-glare filter bezel 15 of complementary cross-section shape and size, as discussed regarding clamp 50. Also, the third and fourth side members define an opening 152 in the enclosure, generally in the bottom front thereof, which permits mounting and demounting the bezel as discussed regarding clamp 50. That is, the four side members and the opening function as described regarding clamp 50 to provide interference and snap fit operation, and to hold the filter with the plane thereof oriented generally vertically along the monitor in front of the viewing screen or face of the monitor.

As shown in FIG. 11, the top leg member 121 is arcuate, convex viewed from above, to accommodate flexing of the hanger due to the weight of the filter 12.

Referring further to FIG. 12. preferably the first leg member 122 is of convex cross-section top-to-bottom (viewed from the front) and extends downward beyond the third side member 158, proximate the bottom of the enclosure and the opening 152. This proximity helps retain the bezel in the clamp. As shown in FIG. 11, the curved, horizontally elongated member 122 covers the clamp components and the clamp-bezel interface and provides a pleasing, uniform appearance.

FIG. 13 depicts a simple alternative 170 to the clamp 150, in which the first leg member is not used to cover or shield the clamp. Rather, although its orientation is the same as clamp 150, FIG. 12, clamp 170 is positioned at the front of first leg member 162. As before, the first and second leg members 162 and 121 form an L-configuration. The second side member 177 of the clamp extends downward from (or is formed as an integral extension of) the first leg member 162. The orientation of the other side members is similar to that of clamp 150. That is, first side member 176 extends forward of second side member 177 and relatively short third side member 178 extends downward from the first leg member, spaced forward of the second side member. Finally, relatively short fourth side member 179 extends forward from the second side member, below the first side member. The resulting enclosure and opening 172 are configured similar to, and operate the same as, clamp 150.

FIG. 14 depicts another relatively simple alternative 190 to the clamp 150, in which the first leg member does not cover or shield the clamp. Here, the clamp's orientation is reversed, top-to-bottom, relative to that of clamps 150 and 170. Similar to clamp 170, the first and second leg members 182 and 121 form an L-configuration, and the second side member 197 of the clamp extends downward from (or is formed as an integral extension of) the first leg member 182. However, the relative position of the first and fourth side members is reversed. That is, the first side member 196 extends forward from second side member 197 beneath the position of the forward-extending, relatively short fourth side member 199. The relatively short third side member 198 extends upward from first side member 196, forward of the first side member 197, completing the enclosure and forming an opening 192 in the upper front section of the enclosure.

I. Alternative Bezel and Hanger Configurations

Referring for example to FIG. 3, standard bezels such as 15 (that is, bezels having the same cross-section configuration and the same dimensions) may be used for different sized covers or filters, thus permitting the use of hanger 10 or 100 for a family of covers. The legs of the hangers illustrated in FIGS. 1 and 3, are shown cut away just above (or on either side of) the associated generally rectangular snap-fit clamp. This is done to emphasize that clamps having different shapes and/or clamping mechanisms or functions, can be incorporated into the hanger. For example, and referring to FIG. 1, clamps 30, 50, 70 and 90 can be incorporated into side mount hanger 10. Similarly, and referring to FIGS. 11–14, clamps 170 and 190 can be substituted for clamp 150 in top mount hanger 100.

J. Positioning of Hangers 10, 100, Etc.

Referring again to FIG. 2, preferably, an antiglare filter or other article 12 is supported in front of the monitor screen by mounting two side mount hangers 10 on the opposite side frame members 16 of the bezel, then positioning the upper legs 21 on the top surface 24 of the monitor, and allowing the friction pads 28 to retain the hanger in the selected position. Please note, with the clamps mounted on the outside of the side frame members as depicted in FIG. 2, each clamp and hanger assembly and, in particular, the high frictional engagement of the hanger legs 21 with the top of the monitor, inhibits accidental pivotal movement of the other hanger and clamp which might demount the clamp from the anti-glare filter. However, by the simple expedient of lifting the hanger-filter assembly off the monitor and twisting the clamps, the clamps are easily retracted from the filter, and thus are ready for mounting again or repositioning on the same filter or for mounting on another filter.

Somewhat similarly, and referring to FIG. 11, an antiglare filter or other article 12 is supported in front of the monitor screen by mounting a single top mount hanger 100 intermediate the sides of the bezel 15, preferably at or near the center thereof, then positioning the upper leg 121 of the hanger on the top surface 24 of the monitor, allowing the spaced friction pads 28 to retain the hanger in the selected position. With the clamp mounted on the outside of the top frame member as depicted in FIG. 11, the clamp and hanger assembly and, in particular, the high frictional engagement of the spaced pads 28 on the hanger leg 121 with the top of the monitor, provide stable mounting of the hanger and antiglare filter on the monitor. However, by the simple expedient of lifting the hanger-filter assembly off the monitor and twisting the clamp off the bezel, the clamp is easily removed from the cover.

K. Certain Features and Advantages of Hangers 10 and 100

As mentioned above, the hangers preferably are of plastic such as injection-molded plastic, which provides light weight, ease of design and fabrication and low cost of manufacturing. Alternatively, the present hanger may be formed of other suitable light weight, flexible, easily fabricated materials as well.

The hanger has a number of advantages over prior art holders. For example, the hanger allows the user to snap-fit or otherwise mount it to the frame of a cover such as an anti-reflection filter of the type available from the assignee under the trademark GLARE-GUARD, at the correct height. This allows the clear aperture of the screen to be centered to the clear aperture of the monitor. The clamp or clip can then hang on the computer bezel, which makes installation and removal of the filter very simple.

The hanger readily mounts on and is removed from filters and other covers, etc., for transfer to a different cover for adjusting the position of the cover on the hanger and thus along the front of the monitor (vertical adjustment). The adjustment conforms the cover to monitors and other supporting articles of different sizes. In addition, the hanger conforms the cover to articles of different curvatures as well as to flat surfaces. That is, the hanger may be used to position a cover to a flat faced monitor or panel, to a curved faced monitor, or to a curved panel having a differently curved face.

The hangers which embody the present invention enable one article or object to be mounted onto another without intimate conforming contact between the objects and, thus, can be used to mount objects having different shapes and contours as well as different dimensions. For example, FIG. 2 illustrates mounting a generally flat anti-glare filter 12 onto a monitor 11 which can have a curved front and screen.

Height adjustment can be provided in the center mount hangers 100 by using friction or sticky pads 28 of different thickness.

Finally, but not exhaustively, a single hanger size can mount a family of covers which use a standardized bezel.

Having thus described preferred and alternative embodiments of the present hanger, those of usual skill in the art will readily develop additional modifications and embodiments which are within the scope of the appended claims.

What is claimed is:

1. A hanger comprising (a) an elongated first leg member and (b) an elongated second leg member adapted for sitting on a top surface of an article such as a monitor and joined to the first leg member forming a generally L-shaped configuration such that when the second leg member rests on top of the monitor, the first leg member depends downward from the second leg member along the front of the monitor; and (c) a snap clamp joined to the first leg member, the snap clamp being adapted for holding a member such as a bezel of an anti-glare filter to orient the plane, of the filter generally vertically along the monitor in front of the viewing screen or face of the monitor.

2. The hanger of claim 1, adapted for mounting a member such as a bezel of an antiglare filter via a top section thereof, wherein:

the first leg member and the second leg member being elongated in a horizontal direction side to side along the monitor; and (c) the construction of the snap clamp comprising the following cross-section profile in a vertical plane perpendicular to the horizontal direction of elongation of the first leg member:

a horizontal first side member; a second side member joined to and extending downward from the first side member rearward of the first leg member; a third side member shorter than the second side member and joined to and extending downward from the first side member forward of the second side member; a fourth side member shorter than the first side member and joined to and extending forward from the second side member below the first side member; the first and second side members supporting and orienting the member and the third and fourth side members retaining the member against the first and second side members; and the four side members being of suitable size and spacing for receiving and compressively retaining a horizontal top section of an antiglare filter bezel of given cross-section size, and the third and fourth side members defining an opening in the enclosure generally in the front thereof permitting pivotally inserting the bezel into the enclosure and pivotally removing the bezel from the enclosure.

3. The hanger of claim 1, adapted for mounting a member such as a bezel of an antiglare filter via a side section thereof, wherein when the second leg member is positioned on top of the monitor with the first leg member depending downward along the front of the monitor, the elongation of the hanger is characterized by elongation of the second leg member in a horizontal direction front to rear along the top of the monitor, and elongation of the first leg member in a vertical direction along the front of the monitor; and (c) the construction of the snap clamp further comprising the following cross-section profile in a horizontal plane perpendicular to the vertical direction of elongation of the first leg member:

a first side member joined to, and extending generally front to rear, parallel to the first leg member; a second side member joined to and extending laterally inward from the first side member; a third side member shorter than the second side member and joined to and extending laterally inward from the first side member forward of the second side member; the first, second and third side members forming a generally laterally inward oriented U-shaped enclosure; a fourth side member shorter than the first side member and joined to and extending forward from the second side member inward of the first side member; the four side members being of suitable size and spacing for receiving and compressively retaining a vertical side section of an antiglare filter bezel of given cross-section size; and the third and fourth side members defining an opening in the enclosure generally in the inside front thereof permitting pivotally inserting the bezel into the enclosure and pivotally removing the bezel from the enclosure.

4. A hanger comprising:

(a) a first leg member and (b) a second leg member adapted for sitting on a top surface of an article such as a monitor and joined to the first leg member forming a generally L-shaped configuration such that, when the second leg member rests on the monitor, the first leg member depends downward from the second leg member along the front of the monitor and the first leg member and the second leg member are elongated in a horizontal direction side to side along the monitor; and (c) a snap clamp joined to the first leg member, the construction of the snap clamp comprising the following cross-section profile in a vertical plane perpendicular to the horizontal direction of elongation of the first leg member:

a first side member joined to and extending rearward from the first leg member; a second side member joined to and extending downward from the first side member rearward of the first leg member; a third side member shorter than the second side member and joined to and extending downward from the first side member between the second side member and the first leg member; the first, second and third side members forming an inverted generally U-shaped enclosure; a fourth side member shorter than the first side member and joined to and extending forward from the second side member below the first side member; the four side members being of suitable size and spacing for receiving and compressively retaining a horizontal top section of an antiglare filter bezel of given cross-section size and thereby holding the filter with the plane thereof oriented generally vertically along the monitor in front of the viewing screen or face of the monitor; and the third and fourth side members defining an opening in the enclosure generally in the bottom front thereof permitting pivotally inserting the bezel into the enclosure and pivotally removing the bezel from the enclosure.

5. The hanger of claim 4, wherein the first leg member is of convex cross-section top-to-bottom and is closely spaced to the clamp enclosure and the opening therein, for covering the snap clamp and to facilitate retaining the bezel in the clamp.

6. A hanger comprising:

(a) a first elongated leg member and (b) a second elongated leg member adapted for sitting on a top surface of an article such as a monitor and joined to the first leg member forming a generally L-shaped configuration such that when the second leg member rests on top of the monitor, the first leg member depends downward from the second leg member along the front of the monitor; and (c) a snap clamp joined to the first leg member, the construction of the snap clamp further comprising the following cross-section profile in a horizontal plane perpendicular to the vertical direction of elongation of the first leg member:

a first side member joined to, and extending generally front to rear, parallel to the first leg member; a second side member joined to and extending laterally inward from the first side member; a third side member shorter than the second side member and joined to and extending laterally inward from the first side member forward of the second side member; the first, second and third side members forming a generally laterally inward oriented U-shaped enclosure; a fourth side member shorter than the first side member and joined to and extending forward from the second side member inward of the first side member; the four side members being of suitable size and spacing for receiving and compressively retaining a vertical side section of an antiglare filter bezel of given cross-section size; and the third and fourth side members defining an opening in the enclosure generally in the inside front thereof permitting pivotally inserting the bezel into the enclosure and pivotally removing the bezel from the enclosure.

7. The hanger of any of claims 1, 2, 3, 4, 5 or 6, wherein the first leg member is integral with the second leg member and the snap clamp.

8. The hanger of any of claims 2, 3, 4, 5 or 6, wherein the fourth side member comprises a forward-extending lip.

9. The hanger of claim 2, 4 or 5, wherein the third side member comprises a lip extending downward from the first side member.

10. The hanger of claim 3 or 6, wherein the third side member comprises a lip extending inward from the first side member.

11. The hanger of claim 2, 4 or 5, wherein the fourth side member comprises a forward-extending lip and the third side member comprises a lip extending downward from the first side member.

12. The hanger of claim 3 or 6, wherein the fourth side member comprises a forward-extending lip and the third side member comprises a lip extending inward from the first side member.

13. The hanger of claim 11, wherein the first leg member is of convex cross-section top-to-bottom and is closely spaced to the clamp enclosure and the opening therein, for covering the snap clamp and to facilitate retaining the bezel in the clamp.

14. The hanger of claim 10, wherein the first leg member is of convex cross-section top-to-bottom and is closely spaced to the clamp enclosure and the opening therein, for covering the snap clamp and to facilitate retaining the bezel in the clamp.

* * * * *

UNITED STATES PATENT AND TRADEMARK OFFICE
CERTIFICATE OF CORRECTION

PATENT NO. : 5,803,424
DATED : Sep. 8, 1998
INVENTOR(S) : Donald L. Keehn; David L. Soberanis It is certified that error appears in the above-identified patent and that said Letters Patent is hereby corrected as shown below:

On the title page, under item [56] References Cited U.S. Patent Documents INSERT THE FOLLOWING:

| | | |
|---|---|---|
| 3,189,309 | 6/65 | Hager |
| 3,561,077 | 2/71 | Grant |
| 3,823,443 | 7/74 | Takabayaski |
| 3,912,140 | 10/75 | Franges |
| 4,071,218 | 1/78 | Pecka, et al. |
| 4,112,541 | 9/78 | Tetradis |
| 4,317,262 | 3/82 | Wells, Jr. |
| 4,457,482 | 7/84 | Kitagawa |
| 4,529,268 | 7/85 | Brown |
| 4,632,471 | 12/86 | Visnapuu |
| 4,669,688 | 6/87 | Itoh, et al. |
| 4,705,249 | 11/87 | Edward s |
| 4,807,334 | 2/89 | Blanchard |
| 4,811,465 | 3/89 | Folkmar |
| 4,815,866 | 3/89 | Martone |
| 4,864,190 | 9/89 | Orr |
| 4,871,264 | 10/89 | Robbins, III, et al. |
| 4,897,900 | 2/90 | Baggett |
| 4,958,907 | 9/90 | Davis |
| 4,983,047 | 1/91 | Netto |
| 5,069,529 | 12/91 | Takahashi |
| 5,088,667 | 2/92 | Olson |
| 5,088,674 | 2/92 | Prince |
| 5,125,612 | 6/92 | McNeal |
| Des. 331,397 | 12/92 | Howitt, et al. |

UNITED STATES PATENT AND TRADEMARK OFFICE
CERTIFICATE OF CORRECTION

PATENT NO. : 5,803,424

DATED : Sep. 8, 1998

INVENTOR(S) : Donald L. Keehn; David L. Soberanis

It is certified that error appears in the above-identified patent and that said Letters Patent is hereby corrected as shown below:

Foreign Patent Documents

EP 0506346 A2     9/92     European

Other Publications

3M Commercial Office Supply Division Brochure, 1992

Optical Coating Laboratory, Inc., E-SHIELD GLARE/GUARD Brochure, May, 1993

Optical Coating Laboratory, Inc., STANDARD GLARE/GUARD Brochure, May, 1993

Cover Page, Other Publications, line 1, after "Apr." change "1930" to --1990--

Cover Page, Other Publications, line 4, after "Catalog" change "(p. 430)" to --(p. 43)--

Col. 8, line 37, after "the" change "first" to --second--

Signed and Sealed this

Twenty-ninth Day of June, 1999

Attest:

Q. TODD DICKINSON

*Attesting Officer*     Acting Commissioner of Patents and Trademarks